US007236160B2

(12) United States Patent
Kong

(10) Patent No.: US 7,236,160 B2
(45) Date of Patent: Jun. 26, 2007

(54) APPARATUS AND METHOD FOR DRIVING A TOUCH PANEL HAVING A VARIABLE RESISTOR FOR MAINTAINING A DESIRED VOLTAGE DIFFERENCE BETWEEN ELECTRODES

(75) Inventor: Nam Young Kong, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 184 days.

(21) Appl. No.: 10/318,266

(22) Filed: Dec. 13, 2002

(65) Prior Publication Data
US 2003/0122796 A1    Jul. 3, 2003

(30) Foreign Application Priority Data
Dec. 27, 2001  (KR) ............................. 2001-85975

(51) Int. Cl.
*G09G 5/00* (2006.01)
(52) U.S. Cl. .................. 345/173; 345/174; 345/179; 178/18.01; 178/18.03; 178/18.06; 178/20.1; 341/22; 341/33
(58) Field of Classification Search ........ 345/173–174, 345/179; 178/18.01, 18.03, 18.06, 20.01, 178/20.03; 341/22, 33, 34
See application file for complete search history.

(56) References Cited

U.S. PATENT DOCUMENTS

| | | | | |
|---|---|---|---|---|
| 5,432,304 A | * | 7/1995 | Tanahashi | 178/18.02 |
| 5,496,974 A | * | 3/1996 | Akebi et al. | 178/18.05 |
| 5,790,105 A | * | 8/1998 | Yoshikawa | 345/173 |
| 5,852,260 A | * | 12/1998 | Yoshikawa | 178/18.01 |
| 5,854,451 A | * | 12/1998 | Miyazaki et al. | 178/18.05 |
| 6,208,332 B1 | * | 3/2001 | Ikegami | 345/174 |

FOREIGN PATENT DOCUMENTS

| | | |
|---|---|---|
| JP | 5127827 | 5/1993 |
| JP | 08-110828 | 4/1996 |
| JP | 10-091352 | 4/1998 |

OTHER PUBLICATIONS

S. Osgood, et al. "*Touch Screen Controller Tips*"Burr-Brown Application Bulletin Apr. 2000.
"Analog-Signal Data Acquisition in Industrial Automation Systems", Dallas Semiconductors Maxim, Aug. 1, 2000.
Office Action from Taiwan Patent Office dated Apr. 6, 2006.

\* cited by examiner

*Primary Examiner*—Richard Hjerpe
*Assistant Examiner*—Leonid Shapiro
(74) *Attorney, Agent, or Firm*—McKenna Long & Aldridge LLP

(57) ABSTRACT

An apparatus and a method of driving a touch panel that increases an analog-digital converting range includes a first resistive layer having first and second electrodes formed facing each other along opposing edges of the first resistive layer in a first direction, and a second resistive layer having third and fourth electrodes formed facing each other along opposing edges of the second resistive layer in a second direction. The apparatus also includes a high potential controller for selectively connecting one of the first and third electrodes to a high potential voltage supplied from a high potential voltage source and a low potential controller for selectively connecting one of the second and fourth electrodes to a low potential voltage. Further, a variable resistor is employed for reducing a voltage of the high potential voltage between the high potential controller and the high potential power voltage source.

17 Claims, 4 Drawing Sheets

APPARATUS AND METHOD FOR DRIVING A TOUCH PANEL HAVING A VARIABLE RESISTOR FOR MAINTAINING A DESIRED VOLTAGE DIFFERENCE BETWEEN ELECTRODES

The present invention claims the benefit of Korean Patent Application No. P2001-85975 filed in Korea on Dec. 27, 2001, which is hereby incorporated by reference.

BACKGROUND OF THE INVENTION

1. Field of the Invention

The present invention relates to an apparatus and a method for driving a touch panel, and more particularly, to an apparatus and a method of driving a touch panel that increases an analog-to-digital converting range for improving efficiency.

2. Description of the Related Art

In general, a resistive-type touch panel includes two resistive layers that face each other and are separated with a gap therebetween. One of the two resistive layers has a first pair of electrodes formed facing each other along edges of the resistive layer in a "X" direction, and the other resistive layer has a second pair of electrodes formed facing each other along edges of the other resistive layer in a "Y" direction. Consequently, an electric current is alternately applied through the electrodes in each of the resistive layers, thereby generating a voltage across each of the resistive layers. Thus, when a user presses the touch panel, the two resistive layer contact each other at the location where the user presses, thereby forming a contact point such that the coordinated position in term of the X-Y directions of the contact point can be detected by measuring the changes in voltages in the resistive layers. However, if a current is constantly applied to the resistive layers even during an input waiting period, i.e., when no contact point is made by a user, electric power is wasted during the input waiting period. Thus, in general, no electric current is applied to the touch panel during the input waiting period and the touch panel is designed to automatically detect when a contact point is made by a user.

FIG. 1 illustrates a circuit diagram of a resistive-type touch panel according to a related art, and FIG. 2 illustrates an equivalent circuit diagram of the touch panel of FIG. 1 when the touch panel is pressed by a user according to a related art. In FIG. 1, a pair of square-shaped resistive layers 10 and 12 are formed facing each other with a gap therebetween. The resistive layer 10 has a first electrode A1 and a second electrode A2 formed facing each other along edges of the resistive layer 10 in a "X" direction. The resistive layer 12 has a third electrode A3 and a fourth electrode A4 formed facing each other along edges of the resistive layer 12 in a "Y" direction. The second electrode A2 is connected via a first transistor Tr1 to a power source Vcc supplying a fixed voltage, and the fourth electrode A4 is connected via a second transistor Tr2 to the power source Vcc. In addition, the first electrode A1 is grounded via a third transistor Tr3 in parallel with a first resistor R1, and the third electrode A3 is grounded via a fourth transistor Tr4 in parallel with a second resistor R2. The voltage change of the third electrode A3 is referenced as a first positional detection signal Vx in the "X" direction and the voltage change of the first electrode A1 is referenced as a second positional detection signal Vy in the "Y" direction. Further, each of the transistors Tr1, Tr2, Tr3, and Tr4 is connected to a switching signal (not shown), such that during an input waiting period, all transistors Tr1, Tr2, Tr3, and Tr4 are turned OFF and the first electrode A1 is set to HIGH.

In FIG. 2, when a user presses the touch panel, the two resistive layers 10 and 12 contact each other at a contact point. Accordingly, the current flows to the ground through the resistive layers 10 and 12 and the second resistance R2, and the voltage level of the third electrode A3 also changes. Thus, a detection in changes of the voltage level of the third electrode A3 can be used as an indication on whether the touch panel has been pressed.

Subsequently, when the touch panel has been pressed, a switching control signal (not shown) is applied to bases of the first and third transistors Tr1 and Tr3 to periodically apply a power voltage from the power source Vcc between the electrodes A1 and A2, such that the first positional detection signal Vx can detect the contact point in the "X" direction at the third electrode A3. In addition, an inverted switching control signal (not shown) is applied to bases of the second and fourth transistors Tr2 and Tr4 to periodically apply the power voltage from the power source Vcc between the two electrodes A3 and A4, such that the second positional detection signal Vy can detect the contact point in the "Y" direction at the first electrode A1.

FIG. 3 illustrates a cross-sectional view of a resistive layer according to a related art. In FIG. 3, if a voltage is applied to the resistive layer, the voltage differs across the surface of the resistive layer. For instance, if the power source Vcc supplies a 5V voltage to a first electrode in a resistive layer, a measurement of the voltage taken at a point A adjacent to the first electrode is about 4.5–4.7V. In contrast, a measurement of the voltage taken at a point B adjacent to an opposing electrode is only about 0.3–0.5V. Thus, the voltage decreases across the surface of the resistive layer. Unfortunately, an active area of a touch panel is typically in a center region of the resistive layers. Since a reference voltage of an analog-to-digital converter is typically 5V, a detectable voltage range of about 0.4–4.6V can not be obtained in an active area of the touch panel, which is further away from the opposing electrodes. Thus, the performance of the related art touch panel has not been fully satisfactory.

SUMMARY OF THE INVENTION

Accordingly, the present invention is directed to an apparatus and a method for driving a touch panel that substantially obviates one or more of the problems due to limitations and disadvantages of the related art An object of the present invention is to provide a touch panel driving apparatus that is capable of detecting the coordinate position of a contact point on the touch panel accurately by increasing the voltage applied to a power voltage and controlling the size of the applied voltage by means of a variable resistance.

Another object of the present invention is to enhance the power supply to each resistive layer by having a switch element as an added control on how the current is applied to each electrode to drive the touch panel in first and second directions.

It is yet another object of the present invention to provide a touch panel driving apparatus that increases the level of the supplied power voltage and maintains the desired voltage difference by using variable resistances, such that current signals and coordinates of the contact point are calculated more accurately.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the apparatus for driving a touch panel includes a first resistive layer having first and second electrodes formed facing each other along opposing edges of the first resistive layer in a first direction; a second resistive layer having third and fourth electrodes formed facing each other along opposing edges of the second resistive layer in a second direction, wherein the second resistive layer faces the first resistive layer and is separated from the first resistive layer with a gap therebetween; a high potential controller for selectively connecting one of the first and third electrodes to a high potential voltage supplied from a high potential voltage source; a low potential controller for selectively connecting one of the second and fourth electrodes to a low potential voltage; and a variable resistor for reducing a voltage of the high potential voltage between the high potential controller and the high potential power voltage source.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
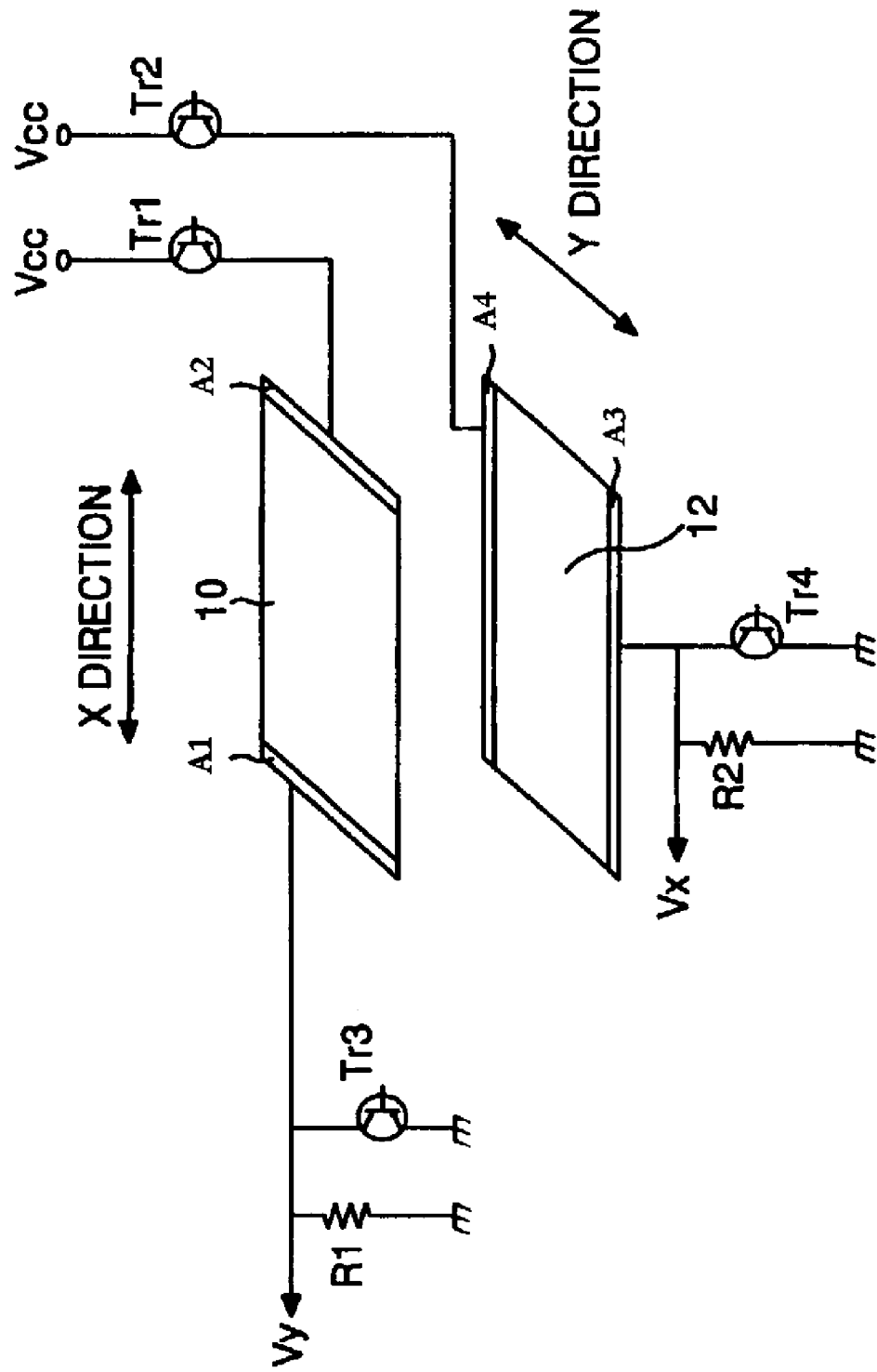
FIG. 1 illustrates a circuit diagram of a resistive-type touch panel according to the related art.
Figure 2:
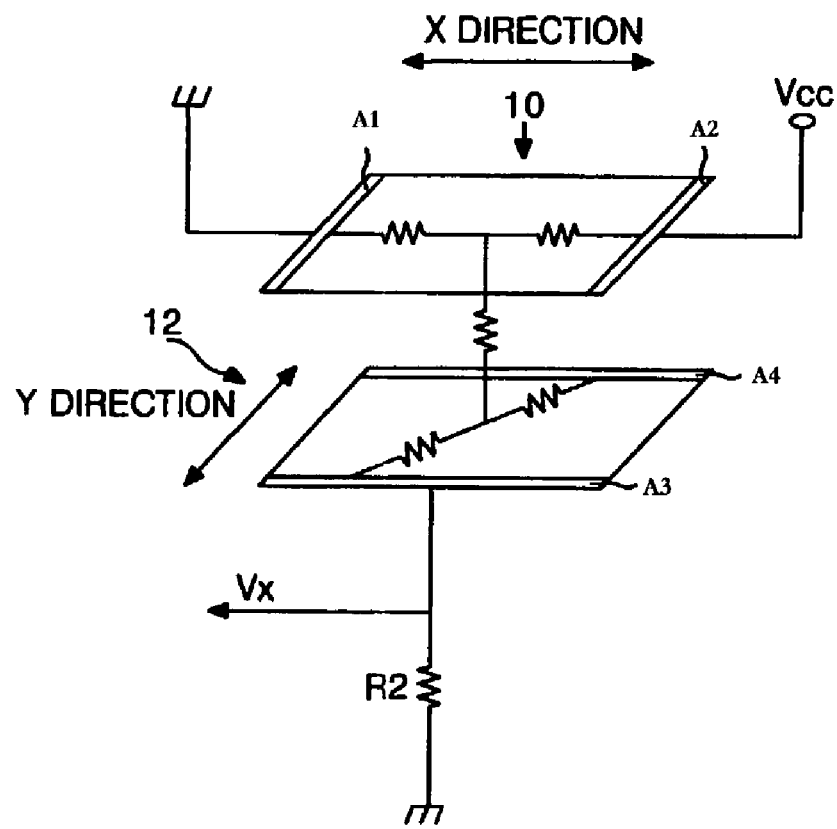
FIG. 2 illustrates an equivalent circuit diagram of the touch panel of FIG. 1 when the touch panel is pressed by a user according to the related art.
Figure 3:
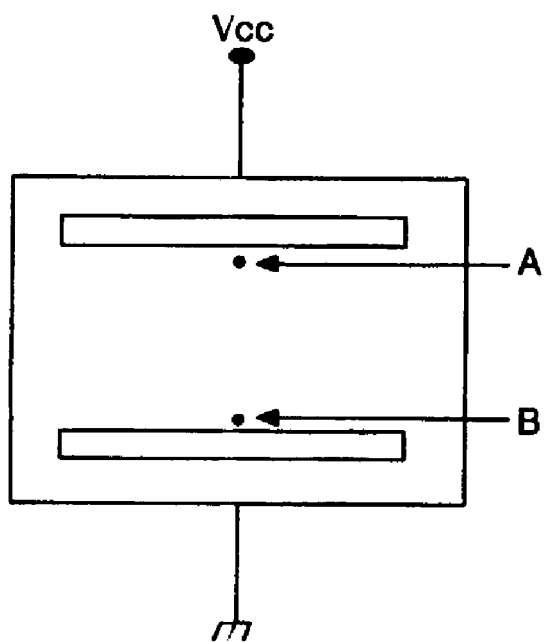
FIG. 3 illustrates a cross-section view of a resistive layer according to a related art.
Figure 4:
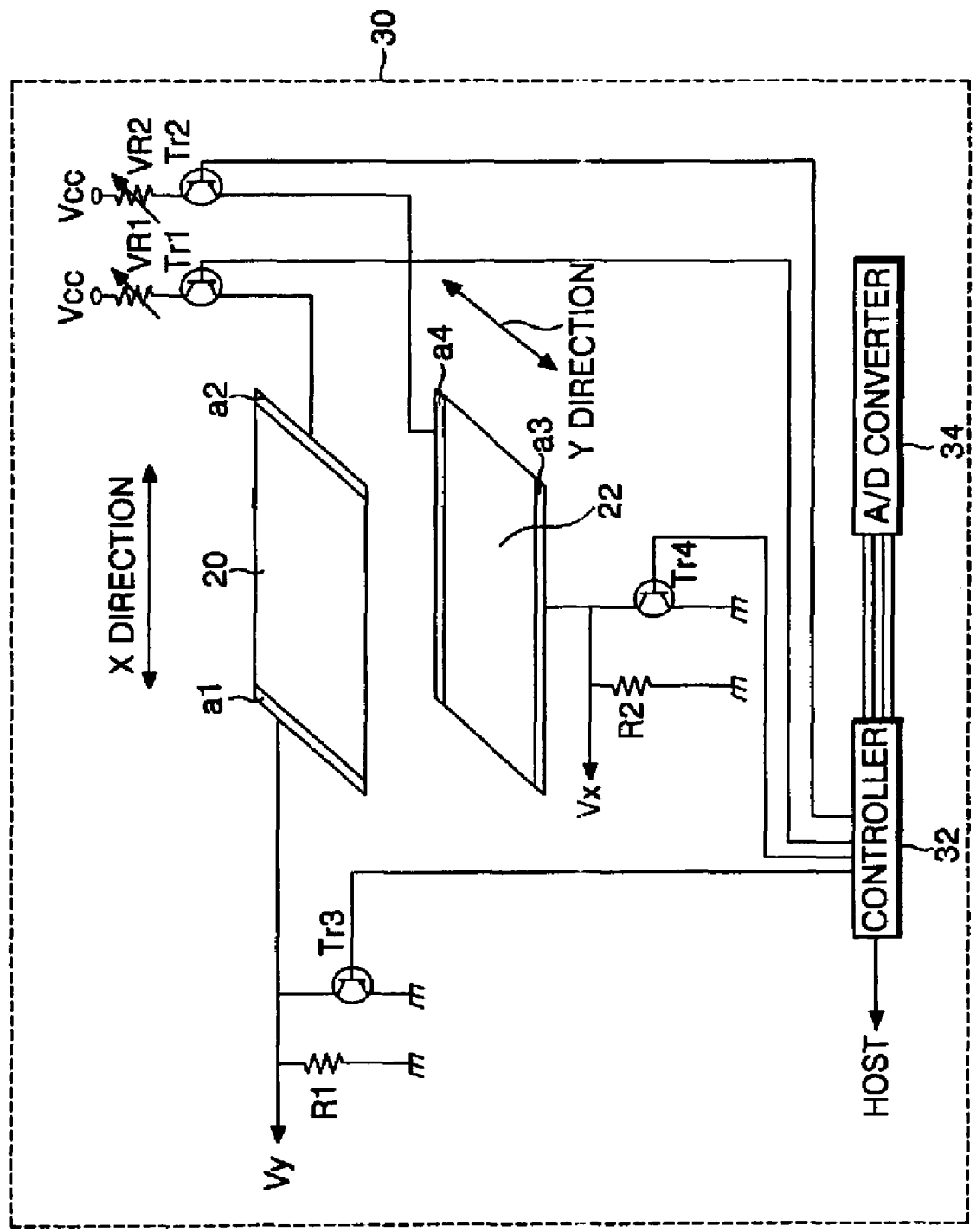
FIG. 4 illustrates a circuit diagram of a touch panel driving apparatus according to the present invention.

FIG. 4 illustrates a touch panel driving apparatus according to an embodiment of the present invention. In FIG. 4, the touch panel driving apparatus may include a touch panel driver 30, a controller 32 for controlling the touch panel driver 30, and an analog-to-digital (A/D) converter 34 connected between the touch panel driver 30 and the controller 32. The touch panel driver 30 may include a touch panel having a pair of square-shaped resistive layers 20 and 22, and a driving circuit (not shown) for driving the touch panel. The resistive layers 20 and 22 may be formed facing each other with a specific gap therebetween. In addition, the resistive layer 20 may have a first electrode a1 and a second electrode a2 formed facing each other along edges of the resistive layer 20 in a "X" direction. The resistive layer 22 may also have a third electrode a3 and a fourth electrode a4 formed facing each other along edges of the resistive layer 22 in a "Y" direction. The second electrode a2 may be connected via a first transistor Tr1 and a first variable resistance Vr1 to a power source Vcc supplying a fixed voltage. The fourth electrode a4 may be connected via a second transistor Tr2 and a second variable resistance Vr2 to the power source Vcc. In addition, the first electrode a1 may be grounded via a third transistor Tr3 in parallel with a first resistor R1, while the third electrode a3 may be grounded via a fourth transistor Tr4 in parallel with a second resistor R2. The voltage change of the third electrode a3 may be referenced as a first positional detection signal Vx in the "X" direction and the voltage change of the first electrode a1 may be referenced as a second positional detection signal Vy in the "Y" direction. Further, each of the transistors Tr1, Tr2, Tr3, and Tr4 may be connected to a switching signal (not shown), such that during an input waiting period, all the transistors Tr1, Tr2, Tr3, and Tr4 may be turned OFF and the first electrode A1 may be set to HIGH.

Figure 5:
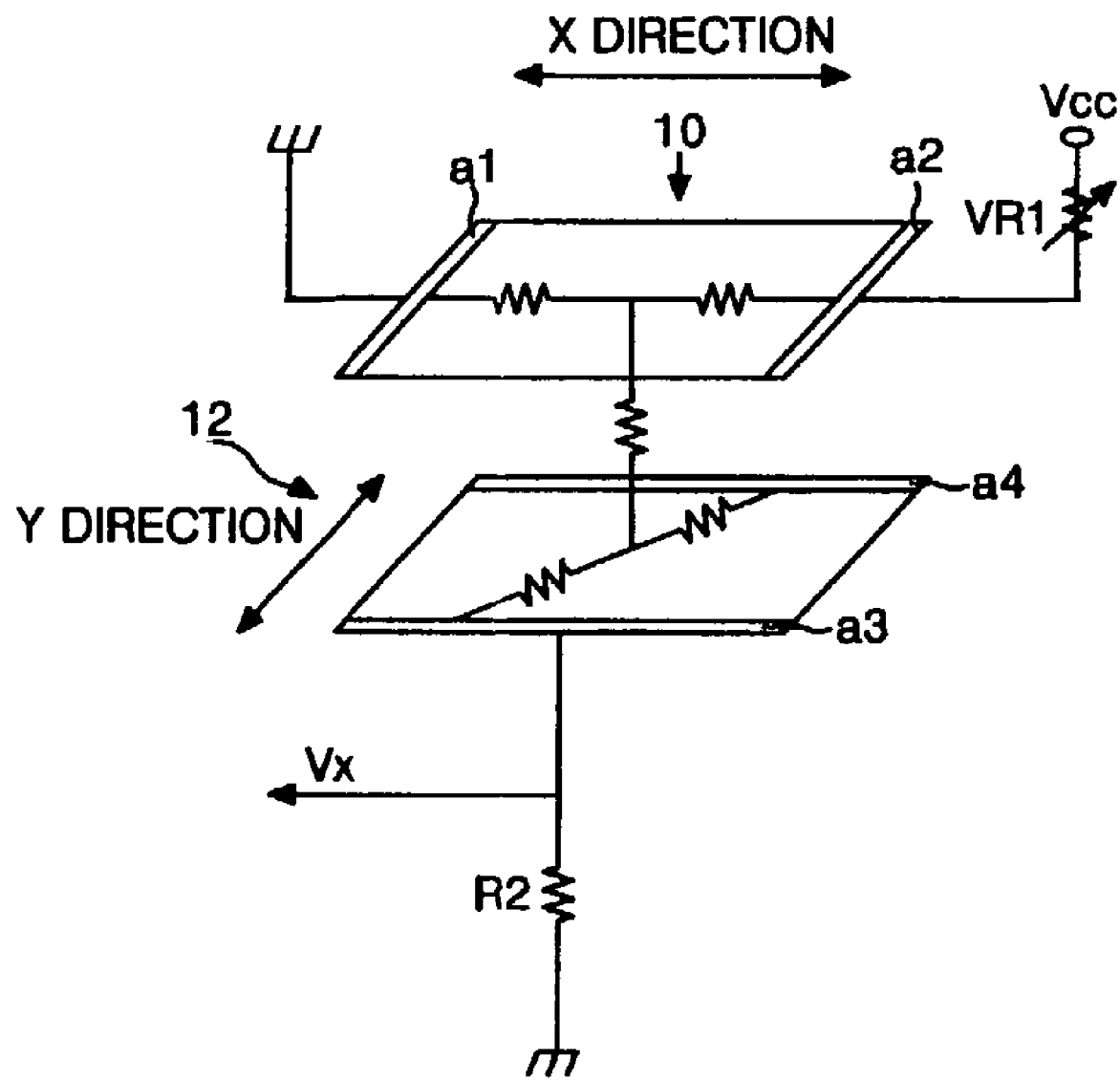
FIG. 5 illustrates an equivalent circuit diagram of the touch panel when the touch panel is press by a user according to the present invention.

FIG. 5 illustrates an equivalent circuit diagram of the touch panel when the touch panel is pressed by a user according to the present invention. In FIG. 5, when a user presses the touch panel, the two resistive layers 20 and 22 contact each other at a contact point where the user pressed. In FIG. 5, a current may flow to ground through the resistive layers 20 and 22, the first variable resistance Vr1, and the second resistor R2. Accordingly, a voltage level of the third electrode a3 may also change. Thus, a detection in changes of the voltage level of the third electrode a3 may also indicate whether the touch panel has been pressed and whether the input waiting period has expired.

Subsequently, when a change of the voltage level of the third electrode a3 has been detected (i.e., the touch panel has been pressed and the input waiting period has expired), a switching control signal (not shown) may be applied to bases of the first and third transistors Tr1 and Tr3 to periodically supply a power voltage from the power source Vcc between the first and second electrodes a1 and a2, such that the first positional detection signal Vx may detect the contact point in the "X" direction at the third electrode a3. In addition, an inverted switching control signal (not shown) may be supplied to bases of the second and fourth transistors Tr2 and Tr4 to periodically apply the power voltage from the power source Vcc between the third and fourth electrodes a3 and a4, such that the second positional detection signal Vy may detect the contact point in the "Y" direction at the first electrode a1. Moreover, the power voltage supplied from the power source Vcc may be fixed at a range of about 8–12V, while a ground voltage from the ground may be set about 0V.

The controller 32 may supply the switching control signal and the inverted switching control signal for controlling the transistors Tr1, Tr2, Tr3, and Tr4. In addition, the controller 32 may supply digital data including four position detection signals representing the positional detection signals Vx and Vy from the A/D converter 34 to a host (not shown). Specifically, the A/D converter 34 may convert the voltages at the electrodes and reflect the voltages into digital data, such that the digital data may be provided as an "if-pressed" detection signal, a first positional detection signal in the "X" direction and a second positional detection signal in the "Y" direction. Thus, the digital data may have 2n bit value. Subsequently, the host may calculate the coordinated position of the contact point based on the digital data, and before calculating the coordinated position of the contact point, the host may also calculate the level of the current signal Xu and Yu (not shown) of the touch panel based on the positional detection signals.

According to the present invention, the power voltage supplied from the power source Vcc may be within the range of about 8–12V, then the variable resistance Vr1 or Vr2 may provide a specific voltage drop to the power voltage. For instance, when the switching control signal turns ON the transistor Tr1 by the controller 32, the dropped voltage is applied to the second electrode a2. Subsequently, the resistance value of the variable resistance Vr1 may be set to form a 5V voltage difference between the electrodes a1 and a2. Accordingly, even when the power voltage is insufficient to maintain a desired voltage difference between the electrodes of the touch panel, the variable resistance may provide for the voltage difference. Thus, an accurate position of the contact point may be detected through the constantly-maintained electric potential based on the 2n bits data from the A/D converter.

It will be apparent to those skilled in the art that various modifications and variations can be made in the apparatus and the method for driving a touch panel of the present invention without departing from the spirit or scope of the invention. Thus, it is intended that the present invention cover the modifications and variations of this invention provided they come within the scope of the appended claims and their equivalents.

What is claimed is:

1. A touch panel driving apparatus, comprising:
   a first resistive layer having first and second electrodes formed facing each other along opposing edges of the first resistive layer in a first direction;
   a second resistive layer having third and fourth electrodes formed facing each other along opposing edges of the second resistive layer in a second direction, wherein the second resistive layer faces the first resistive layer and is separated from the first resistive layer with a gap therebetween;
   a first variable resistor for variably reducing a high potential voltage supplied from a high potential voltage source;
   a second variable resistor for variably reducing a high potential voltage supplied from the high potential voltage source;
   a high potential controller for selectively connecting the first electrode to the high potential voltage source via the first variable resistor and for selectively connecting the third electrode to the high potential voltage source via the second variable resistor;
   a low potential controller for selectively connecting one of the second and fourth electrodes to a low potential voltage;
   an analog to digital converter for converting voltages at the second and fourth electrodes into digital data; and
   a controller for controlling the high potential controller and the low potential controller,
   wherein the resistance value of the first variable resistor is set based on a first voltage between the first and second electrodes, and the resistance value of the second variable resistor is set based on a second voltage between the third and fourth electrodes.

2. The apparatus according to claim 1, wherein the digital data represents a detection signal indicating whether a touch panel is pressed, a position detection signal in the first direction, and a position detection signal in the second direction.

3. The apparatus according to claim 1, wherein the digital data includes 2n bit-type data.

4. The apparatus according to claim 1, wherein the high potential voltage is substantially within a range of about 8–12 volts.

5. The apparatus according to claim 1, wherein the low potential voltage is substantially zero volts.

6. The apparatus according to claim 1, wherein when a position of where a touch panel is pressed is being detected, the first and second variable resistors variably reduce the high potential voltage to maintain the first voltage and the second voltage at substantially 5 volts.

7. A method for driving a touch panel apparatus, comprising the steps of:
   forming first and second electrodes facing each other along opposing edges of a first resistive layer in a first direction;
   forming third and fourth electrodes facing each other along opposing edges of a second resistive layer in a second direction;
   forming the second resistive layer to face the first resistive layer with a gap therebetween;
   selectively connecting the first electrode to a high potential voltage source via a first variable resistor, the high potential voltage source supplying a high potential voltage;
   selectively connecting the third electrode to the high potential voltage source via a second variable resistor; and
   selectively connecting one of the second and fourth electrodes to a low potential voltage,
   wherein the resistance value of the first variable resistor is set based on a first voltage between the first and second electrodes, and the resistance value of the second variable resistor is set based on a second voltage between the third and fourth electrodes.

8. The method according to claim 7, further comprising a step of converting voltages at the second and fourth electrodes into digital data, when one of the first and third electrodes is connected to the high potential voltage source via the variable resistor.

9. The method according to claim 8, wherein the digital data represents a detection signal indicating whether a touch panel is pressed, a position detection signal in the first direction, and a position detection signal in the second direction.

10. The method according to claim 8, wherein the digital data includes 2n bit-type data.

11. The method according to claim 7, further comprising a step of setting the high potential voltage to be substantially within a range of about 8–12 volts.

12. The method according to claim 7, further comprising a step of setting the low potential voltage to be substantially zero volts.

13. The apparatus according to claim 1, wherein the high potential controller periodically connects the first electrode to the high potential voltage source via the first variable resistor by using a first switch, and the high potential controller periodically connects the third electrode to the high potential voltage source via the second variable resistor by using a second switch.

14. The apparatus according to claim 1, wherein only one of the first and third electrodes is connected to the high potential voltage source via the variable resistor at a time.

15. The method according to claim 7, wherein controlling the first and second variable resistor includes setting the resistance value of the variable resistor to maintain the first voltage and the second voltage at substantially 5 volts when detecting a position of where a touch panel is pressed.

16. The method according to claim 7, wherein the first electrode is periodically connected to the high potential voltage source via the first variable resistor using a first switch, and the third electrode is periodically connected to the high potential voltage source via the second variable resistor using a second switch.

17. The method according to claim 7, wherein only one of the first and third electrodes is connected to the high potential voltage source via the variable resistor at a time.

* * * * *